(12) United States Patent
Luo et al.

(10) Patent No.: US 12,136,790 B2
(45) Date of Patent: Nov. 5, 2024

(54) CRIMP TERMINAL, CRIMP TERMINAL MODULE, TERMINAL BOX AND TESTER

(71) Applicant: Beijing Const Instruments Technology Inc., Beijing (CN)

(72) Inventors: Qiqi Luo, Beijing (CN); Xilei Tian, Beijing (CN)

(73) Assignee: Beijing ConST Instruments Technology Inc. (CN)

( * ) Notice: Subject to any disclaimer, the term of this patent is extended or adjusted under 35 U.S.C. 154(b) by 875 days.

(21) Appl. No.: 17/285,220

(22) PCT Filed: Mar. 1, 2019

(86) PCT No.: PCT/CN2019/076699
§ 371 (c)(1),
(2) Date: Oct. 28, 2021

(87) PCT Pub. No.: WO2020/077933
PCT Pub. Date: Apr. 23, 2020

(65) Prior Publication Data
US 2022/0052463 A1    Feb. 17, 2022

(30) Foreign Application Priority Data

Oct. 15, 2018   (CN) .......................... 201811195195.4
Oct. 15, 2018   (CN) .......................... 201821664780.X

(51) Int. Cl.
*G01K 1/14*          (2021.01)
*H01R 4/48*          (2006.01)
(Continued)

(52) U.S. Cl.
CPC ................. *H01R 4/48* (2013.01); *G01K 1/14* (2013.01); *H01R 12/515* (2013.01); *G01K 7/02* (2013.01);
(Continued)

(58) Field of Classification Search
CPC ...... H01R 4/48; H01R 12/515; H01R 12/716; G01K 1/14; G01K 7/02; G01K 7/16
See application file for complete search history.

(56) References Cited

U.S. PATENT DOCUMENTS 6,146,217 A    11/2000  Osada
6,353,396 B1 *  3/2002  Atlas ..................... G08B 21/06
                                                    340/576
(Continued)

FOREIGN PATENT DOCUMENTS

CN          1444785 A   *  9/2003  ........... H01R 4/4836
CN        101834365 A   *  9/2010
(Continued)

OTHER PUBLICATIONS

17285220_2024-04-11_CN_1444785_A_H.pdf,Sep. 24, 2003.*
(Continued)

*Primary Examiner* — Gail Kaplan Verbitsky
(74) *Attorney, Agent, or Firm* — Lerner David LLP

(57) ABSTRACT

A crimp terminal (100, 101, 102, 103), a crimp terminal module (200), a terminal box and a tester. The crimp terminal is used for connecting to a wiring end of a sensing element. A press button (03) of the crimp terminal is pressed to drive a wiring port (010), formed by attaching a first attachment sheet (05) to a second attachment sheet (08), to open, so as to insert the wiring end of the sensing element into the wiring port. Compared with a traditional screwing means, the crimp terminal can reduce heat generated by friction and reduce the contact potential between a plug and the terminal, and facilitates improving working efficiency of batch detection.

24 Claims, 11 Drawing Sheets

(51) Int. Cl.
*H01R 12/51* (2011.01)
*G01K 7/02* (2021.01)
*G01K 7/16* (2006.01)
*H01R 12/71* (2011.01)

(52) U.S. Cl.
CPC .............. *G01K 7/16* (2013.01); *H01R 12/716* (2013.01); *H01R 2201/20* (2013.01)

(56) References Cited

U.S. PATENT DOCUMENTS

| | | | | |
|---|---|---|---|---|
| 6,788,054 | B2* | 9/2004 | Collins | ................ G01D 11/245 73/866.5 |
| 9,354,158 | B1* | 5/2016 | van Dijk | ................ H01R 43/26 |
| 2004/0102078 | A1 | 5/2004 | Miyoshi et al. | |
| 2006/0288757 | A1* | 12/2006 | Nishio | .................. H01R 4/184 73/1.02 |
| 2007/0127562 | A1* | 6/2007 | Gehring | ................. H04L 1/203 375/227 |
| 2018/0342775 | A1* | 11/2018 | Sei | ...................... H01M 50/507 |
| 2023/0121789 | A1* | 4/2023 | Flores | ..................... G01K 1/10 374/183 |

FOREIGN PATENT DOCUMENTS

| | | | | |
|---|---|---|---|---|
| DE | 1902063 | U | 10/1964 | |
| DE | 3020837 | A * | 12/1980 | .......... H01R 4/4845 |
| GB | 2053588 | A | 2/1981 | |
| JP | S55156372 | U | 11/1980 | |
| JP | 2005024344 | A * | 1/2005 | ............... G01K 1/08 |
| KR | 20130005137 | U * | 8/2013 | |
| WO | WO-0213319 | A1 * | 2/2002 | .......... H01R 4/4836 |

OTHER PUBLICATIONS

17285220_2024-04-15_JP_2005024344_A_H.pdf,Jan. 27, 2005.*
17285220_2024-04-15_KR_20130005137_U_H.pdf,Aug. 29, 2013.*
17285220_2024-07-17_CN_101834365_A_H.pdf,Sep. 15, 2010.*
17285220_2024-07-17_DE_3020837_A_H.pdf,Dec. 18, 1980.*
17285220_2024-07-17_WO_0213319_A1_H.pdf,Feb. 14, 2002.*
International Search Report for PCT/CN2019/076699 mailed Mar. 28, 2019; 2 pages.
Extended European Search Report including Written Opinion for Application No. 19874287.6 dated Jun. 10, 2022, pp. 1-10.

* cited by examiner

CRIMP TERMINAL, CRIMP TERMINAL MODULE, TERMINAL BOX AND TESTER

FIELD OF THE INVENTION

The present invention belongs to the electrical field and relates to a crimp terminal, a crimp terminal module, a terminal box and a tester.

BACKGROUND OF THE INVENTION

At present, in the electrical field, wire terminals of temperature, pressure, humidity and other sensing elements, such as thermal resistor, thermocouple, etc., are usually provided with different sizes and specifications of bare wires, spade plugs, banana plugs, and other terminals. For example, wiring ends of thermocouple wires may also be provided with Min-TC terminals. When various sensing elements are tested, verified or calibrated, specific signal wire connection terminals are usually used for connection.

Taking thermal resistor and thermocouple as examples. Thermal resistor is a kind of thermistor, which shows different resistance values at different temperatures. The ambient temperature of the thermal resistor is determined by detecting the resistance of the thermal resistor. The rate of change of resistance of thermal resistor with temperature is usually at a level of $10^{-3} \Omega/°C$. Thermocouple has nodes composed of two wires of different materials, and the thermoelectric potential between the nodes is different at different temperatures. the ambient temperature of the node can be determined by detecting the thermoelectric potential between the nodes. The rate of change of thermoelectric potential between thermocouple nodes with temperature is usually $10^{-6}$ mV/°C. Therefore, in order to accurately detect the resistance of the thermal resistor or the thermoelectric potential of the thermocouple, it is required that when the thermal resistor or the thermocouple are connected to the detector, the contact pressure and contact temperature of the contact point are stable enough and consistent as much as possible with the temperature of the thermal resistor or the thermocouple.

Contact with any material will produce contact resistance, contact potential or contact thermoelectric potential. The contact resistance, contact potential and contact thermoelectric potential generated by contact of different materials are different. When the electrical signals of thermal resistor and thermocouple are detected, the wiring end specifications at the detection end are also different. This requires a matched wiring end for connection when connected to the detector, or the terminal at the detection end be replaced with one that matches the wiring terminal of the detector. This method will affect the measurement accuracy of thermal resistor and thermocouple, especially high-precision thermal resistor and thermocouple. In addition, when testing thermal resistor and thermocouple in large quantities, detachment and replacement of the detection end terminal of the thermal resistor and thermocouple will lead to a significant increase in workload.

SUMMARY OF THE INVENTION

The present invention provides a crimp terminal, a crimp terminal module, a terminal box and a tester capable of connecting to terminal specifications of different wiring ends of sensing elements, and convenient to operate.

The present invention adopts the following technical solutions:

A crimp terminal, comprising: a housing (00); a press button (03), an upper portion of which is protruded from a first opening (012) provided in the housing (00), and a lower portion of which is located in the housing (00); and a crimping mechanism located in the housing (00) and in contact with the lower portion of the press button (03), the crimping mechanism being provided with an openable and closable wiring port (010), and the housing (00) being provided with a second opening (013) corresponding to the wiring port (010), wherein when the press button (03) is pressed vertically, the wiring port (010) is opened, allowing the wiring end of the sensing element to be inserted into the wiring port from the second opening (013).

In the above crimp terminal, a top end of the press button (03) is provided with a wiring jack (034), and an inner portion of the press button (03) is provided with an accommodating cavity for accommodating the wiring end of the sensing element, the accommodating cavity being communicated with the wiring jack (034), and wherein a conductive post (04) is arranged in the accommodating cavity, so that the wiring end of the sensing element inserted into the accommodating cavity through the wiring jack (034) is electrically connected to the conductive post (04).

In the above crimp terminal, the conductive post (04) is protruded outward from a bottom of the housing (00) so as to be electrically connected to a circuit board (11) disposed below the housing (00).

The above crimp terminal further comprises a first elastic member (06) arranged below the press button (03) to provide an elastic force for restoration of the press button (03).

In the above crimp terminal, the conductive post (04) is a banana socket, and the first elastic member (06) is a spring, which is fitted over a portion of the banana socket extended out of the accommodating cavity of the press button (03).

In the above crimp terminal, the crimping mechanism comprises a first attachment sheet (05) and a second attachment sheet (08) that are separable from and attachable to each other, and the wiring port (010) is formed where the second attachment sheet (08) and the first attachment sheet (05) are attached to each other, and wherein the first attachment sheet (05) is made of a metal and is in contact with the conductive post (04), so that the wiring end of the sensing element inserted into the wiring port (010) is electrically connected to the conductive post (04).

In the above crimp terminal, the first attachment sheet (05) is a bending piece connected by a vertical wall and a horizontal wall, the vertical wall of the first attachment sheet (05) is attached to the second attachment sheet (08), and the horizontal wall of the first attachment sheet (05) is provided with a through hole, through which the conductive post (04) penetrates.

In the above crimp terminal, the second attachment sheet (08) has two vertical edges that are bent in the same direction to wrap the first attachment sheet (05), and the two bent edges of the second attachment sheet (08) are in slide contact with the lower portion of the press button (03), so that when the press button (03) is moved vertically, the second attachment sheet (08) is moved horizontally to be separated from the first attachment sheet (05).

In the above crimp terminal, the lower portion of the press button (03) is provided with downward press button inclined surfaces (031), the two bent edges of the second attachment sheet (08) are provided with upward first inclined surfaces (081), and the first inclined surfaces (081) are in slide contact with the press button inclined surfaces (031), respectively.

Alternatively, the lower portion of the press button (03) is provided with downward press button arc surfaces (032), the two bent edges of the second attachment sheet (08) are provided with upward first inclined surfaces (081), and the first inclined surfaces (081) are in slide contact with the press button arc surfaces (032), respectively, Alternatively, the lower portion of the press button (03) is provided with downward press button inclined surfaces (031), the two bent edges of the second attachment sheet (08) are provided with upward first arc surfaces (082), and the press button inclined surfaces (031) are in slide contact with the first arc surfaces (082), respectively.

In the above crimp terminal, an arc-shaped protrusion (051) is provided on a side of the first attachment sheet (05) being attached to the second attachment sheet (08).

The above crimp terminal further comprises an elastic mechanism arranged between the second attachment sheet (08) and an inner wall of the housing (00), wherein the elastic mechanism provides an elastic force for restoration of the second attachment sheet (08), so that the second attachment sheet (08) is attached to the first attachment sheet (05).

In the above crimp terminal, the elastic mechanism comprises a limiting block (09) and a second elastic member (10), the limiting block (09) is attached to the second attachment sheet (08) and limits the second elastic member (10), and the second attachment sheet (08) is attached to the first attachment sheet (05) under an elastic force of the second elastic member (10).

In the above crimp terminal, the second elastic member (10) is a spring, the limiting block (09) is fixed on a back of the second attachment sheet (08), the limiting block (09) is provided with a plurality of circular holes into each of which a spring is fitted, and there is a distance between the limiting block (09) and the inner wall of the housing (00).

In the above crimp terminal, the elastic mechanism is a C-shaped elastic sheet (18) located between the second attachment sheet (08) and the inner wall of the housing (00), having at least one end of a C-shaped opening thereof supported on the second attachment sheet (08) and a C-shaped closed end surface thereof in contact with the inner wall of the housing (00).

In the above crimp terminal, the second attachment sheet is replaced with an S-shaped crimp block (17).

The crimp block (17) is arranged between the press button (03) and the vertical wall of the first attachment sheet (05), and the lower portion of the press button (03) is rotatably connected to an S-shaped lower bending end of the crimp block (17), wherein when the press button (03) is vertically pressed or released, the crimp block (17) is driven to rotate along a rotating shaft (172) provided at the lower bending end, and an upper bending end (171) of the crimp block (17) acting as a pressing edge is driven to be separated from or close to the first attachment sheet (05), so that the wiring port (010) formed where the upper bending end (171) contacts the vertical wall of the first attachment sheet (05) is opened or closed.

In the above crimp terminal, the crimp block (17) is provided with a vertical crimp plate, and the rotating shaft (172) is provided at a bottom of the crimp plate, wherein an end of the lower bending end is provided with a crimp post (173), which is inserted into a press button limiting hole (033) provided at the lower portion of the press button (03), and is movable in the press button limiting hole (033).

The above crimp terminal further comprises a temperature sensor configured to sense a temperature of the first attachment sheet (05), so as to obtain a temperature of the wiring end of the sensing element inserted from the wiring port (010) and the wiring jack (034).

The above crimp terminal further comprises a compensation plate (14) on which a metal conductive sheet is arranged, wherein the metal conductive sheet is in contact with the first attachment sheet (05), and the temperature sensor senses the temperature of the first attachment sheet (05) by sensing a temperature of the metal conductive sheet.

In the above crimp terminal, a third opening (021) is provided on the bottom of the housing (00) at a position corresponding to the first attachment sheet (05), the compensation plate (14) is installed outside of the bottom of the housing (00), and the metal conductive sheet on the compensation plate is in contact with the first attachment sheet (05) through the third opening (021).

In the above crimp terminal, a wiring end electrically connected to the temperature sensor is provided on the compensation plate (14) and for electrical connection to the circuit board (11).

In the above crimp terminal, the metal conductive sheet and the temperature sensor are respectively arranged on an upper surface and a lower surface of the compensation plate, and the metal conductive sheet is in contact with the first attachment sheet (05).

In the above crimp terminal, the first attachment sheet (05) and the conductive post (04) are both made of tellurium copper alloy with metal plating.

The present invention also provides a crimp terminal module, comprising a housing and a plurality of crimp terminals independent from each other, wherein each of the crimp terminals is a crimp terminal according to any one of claims 1 to 22, and the housings (00) of the crimp terminals are integrated into the housing of the crimp terminal module.

In the above crimp terminal module, the first attachment sheet (05) of each crimp terminal is in contact with the metal conductive sheet provided on the compensation plate, respectively.

The present invention also provides a terminal box, comprising at least one crimp terminal module as described above, wherein each crimp terminal module is electrically connected to the circuit board (11), respectively.

The present invention also provides a tester, comprising a host machine with a display screen and the terminal box as described above, wherein the terminal box transmits electrical parameters of test wires connected to the terminal box to the host machine, and the host machine obtains a display result according to the electrical parameters, and displays the display result on the display screen.

Due to adopting the above design, the present invention has the following advantageous effects. In the crimp terminal according to the embodiment of the present invention, the press button is pressed to drive the second attachment sheet to move horizontally or rotate, so that the wiring port formed between the first attachment sheet and the second attachment sheet is opened or closed. Compared with a conventional screwing means, the crimp terminal can reduce heat generated by friction and reduce contact potential of the wiring terminal of the sensing element. The first attachment sheet is provided on the crimp terminal to facilitate rapid heat equalization. A plurality of crimp terminals can be combined into different types of crimp terminal modules. A compensation plate is provided in the crimp terminal module, which helps to compensate temperature difference electric potential and improve detection accuracy. The crimp terminal and crimp terminal module of the present invention are simple to operate and convenient to use, facilitate

REFERENCE NUMERALS

Figure 1:
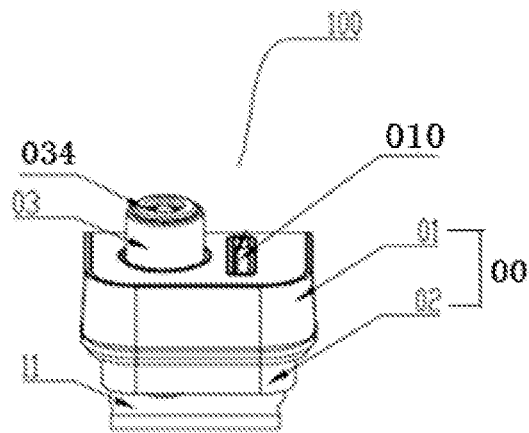
FIG. 1 is a perspective structural view of a crimp terminal according to a first embodiment of the present invention.

00: housing, 01: face cover, 011: clasp, 012: first opening, 013: second opening; 02:
lower housing, 021: third opening, 022: mounting hole; 010: wiring port;
03: press button, 031: press button inclined surface, 032: press button arc surface,
033: press button limiting hole, 034: wiring jack;
04: conductive post;
05: first attachment sheet, 051: protrusion;
06: first elastic member; 07: color code;
08: second attachment sheet, 081: first inclined surface;
09: limiting block; 10: second elastic member; 11: circuit board; 12: screw; 13:
panel; 14: compensation plate, 15: compensation plate support;
17: crimp block, 171: upper bending end, 172: rotating shaft, 173: crimp post;
18: C-shaped elastic sheet;
001: banana plug; 002: spade plug; 003: bare wire; 004: Min-TC plug;
005: movement direction of the press button; 006: movement direction of the second
attachment sheet; 007: rotation direction of the crimping mechanism;
1: first terminal, 2: second terminal, 3: third terminal, 4: fourth terminal;
100/101/102/103: crimp terminal;
200: crimp terminal module.

DETAILED DESCRIPTION OF THE EMBODIMENT(S)

The existing wiring terminals are easy to produce contact potential, the screwing connection is easy to generate heat by friction and affect detection accuracy, and the existing wiring terminals cannot meet the connection needs for different types of wire terminals, and are inconvenient to operate. In view of the above shortages, the present invention provides a crimp terminal, a crimp terminal module, a terminal box and a tester that are capable of connecting to wires with different wiring end specifications. The crimp terminal drives the wiring port to open through pressing of the press button, so that the wiring end of the sensing element is inserted into the wiring port from the second opening on the housing corresponding to the wiring port, or the wiring end of the sensing element is directly inserted into the accommodating cavity provided inside the press button from the first opening of the housing through the wiring jack on the top of the press button. Compared to the conventional screwing means, the crimp terminal reduces heat generation and is more convenient to use.

The crimp terminal of the present invention comprises a housing, a press button, and a crimping mechanism located in the housing, wherein the crimping mechanism is provided with an openable and closable wiring port, an upper portion of the press button is protruded from a first opening provided in the housing and a lower portion thereof is located in the housing, the crimping mechanism is in contact with the lower portion of the press button, and the housing is provided with a second opening corresponding to the wiring port, wherein when the upper portion of the press button is pressed vertically, the wiring port is opened so that the wiring end of the sensing element can be inserted into the wiring port from the second opening, which reduces friction and heat generation.

An embodiment of the present invention provides a crimp terminal, comprising: a housing; a press button, an upper portion of which is protruded from a first opening provided in the housing, and a lower portion of which is located in the housing; and a crimping mechanism located in the housing and in contact with the lower portion of the press button, the crimping mechanism being provided with an openable and closable wiring port, and the housing being provided with a second opening corresponding to the wiring port, wherein when the press button is pressed vertically, the wiring port is opened, allowing the wiring end of the sensing element to be inserted into the wiring port from the second opening.

In an embodiment, a top end of the press button is provided with a wiring jack, and an inner portion of the press button is provided with an accommodating cavity for accommodating the wiring end of the sensing element, the accommodating cavity being communicated with the wiring jack, and wherein a conductive post is arranged in the accommodating cavity, so that the wiring end of the sensing element inserted into the accommodating cavity through the wiring jack is electrically connected to the conductive post.

In an embodiment, the conductive post is protruded outward from a bottom of the housing so as to be electrically connected to a circuit board disposed below the housing.

In an embodiment, further comprised is a first elastic member arranged below the press button to provide an elastic force for restoration of the press button.

In an embodiment, the conductive post is a banana socket, and the first elastic member is a spring, which is fitted over a portion of the banana socket extended out of the accommodating cavity of the press button.

In an embodiment, the crimping mechanism comprises a first attachment sheet and a second attachment sheet that are separable from and attachable to each other, and the wiring port is formed where the second attachment sheet and the first attachment sheet are attached to each other, and wherein the first attachment sheet is made of a metal and is in contact with the conductive post, so that the wiring end of the sensing element inserted into the wiring port is electrically connected to the conductive post.

In an embodiment, the first attachment sheet is a bending piece connected by a vertical wall and a horizontal wall, the vertical wall of the first attachment sheet is attached to the second attachment sheet, and the horizontal wall of the first attachment sheet is provided with a through hole, through which the conductive post penetrates.

In an embodiment, the second attachment sheet has two vertical edges that are bent in the same direction to wrap the first attachment sheet, and the two bent edges of the second attachment sheet are in slide contact with the lower portion of the press button, so that when the press button is moved vertically, the second attachment sheet is moved horizontally to be separated from the first attachment sheet.

In an embodiment, the lower portion of the press button is provided with downward press button inclined surfaces, the two bent edges of the second attachment sheet are provided with upward first inclined surfaces, and the first inclined surfaces are in slide contact with the press button inclined surfaces, respectively.

In an embodiment, the lower portion of the press button is provided with downward press button arc surfaces, the two bent edges of the second attachment sheet are provided with upward first inclined surfaces, and the first inclined surfaces are in slide contact with the press button arc surfaces, respectively.

In an embodiment, the lower portion of the press button is provided with downward press button inclined surfaces, the two bent edges of the second attachment sheet are provided with upward first arc surfaces (not shown), and the press button inclined surfaces are in slide contact with the first arc surfaces, respectively. Specifically, the first inclined surface may be set as the first arc surface.

In an embodiment, an arc-shaped protrusion is provided on a side of the first attachment sheet being attached to the second attachment sheet.

In an embodiment, further comprised is an elastic mechanism arranged between the second attachment sheet and an inner wall of the housing, wherein the elastic mechanism provides an elastic force for restoration of the second attachment sheet, so that the second attachment sheet is attached to the first attachment sheet.

In an embodiment, the elastic mechanism comprises a limiting block and a second elastic member, the limiting block is attached to the second attachment sheet and limits the second elastic member, and the second attachment sheet is attached to the first attachment sheet under an elastic force of the second elastic member.

In an embodiment, the second elastic member is a spring, the limiting block is fixed on a back of the second attachment sheet, the limiting block is provided with a plurality of circular holes into each of which a spring is fitted, and there is a distance between the limiting block and the inner wall of the housing.

In an embodiment, the elastic mechanism is a C-shaped elastic sheet located between the second attachment sheet and the inner wall of the housing (00), having at least one end of a C-shaped opening thereof supported on the second attachment sheet and a C-shaped closed end surface thereof in contact with the inner wall of the housing.

In an embodiment, the second attachment sheet is replaced with an S-shaped crimp block.

The crimp block is arranged between the press button and the vertical wall of the first attachment sheet, and the lower portion of the press button is rotatably connected to an S-shaped lower bending end of the crimp block, wherein when the press button is vertically pressed or released, the crimp block is driven to rotate along a rotating shaft provided at the lower bending end, and an upper bending end of the crimp block acting as a pressing edge is driven to be separated from or close to the first attachment sheet, so that the wiring port formed where the upper bending end contacts the vertical wall of the first attachment sheet is opened or closed.

In an embodiment, the crimp block is provided with a vertical crimp plate, and the rotating shaft is provided at a bottom of the crimp plate, wherein an end of the lower bending end is provided with a crimp post, which is inserted into a press button limiting hole provided at the lower portion of the press button, and is movable in the press button limiting hole.

In an embodiment, further comprised is a temperature sensor configured to sense a temperature of the first attachment sheet, so as to obtain a temperature of the wiring end of the sensing element inserted from the wiring port and the wiring jack.

In an embodiment, further comprised is a compensation plate on which a metal conductive sheet is arranged, wherein the metal conductive sheet is in contact with the first attachment sheet, and the temperature sensor senses the temperature of the first attachment sheet by sensing a temperature of the metal conductive sheet.

In an embodiment, a third opening is provided on the bottom of the housing at a position corresponding to the first attachment sheet, the compensation plate is installed outside of the bottom of the housing, and the metal conductive sheet on the compensation plate is in contact with the first attachment sheet through the third opening.

In an embodiment, a wiring end electrically connected to the temperature sensor is provided on the compensation plate and for electrical connection to the circuit board.

In an embodiment, the metal conductive sheet and the temperature sensor are respectively arranged on an upper surface and a lower surface of the compensation plate, and the metal conductive sheet is in contact with the first attachment sheet.

In an embodiment, the first attachment sheet and the conductive post are both made of tellurium copper alloy with metal plating.

An embodiment of the present invention provides a crimp terminal module, comprising a housing and a plurality of crimp terminals independent from each other, wherein each of the crimp terminals is a crimp terminal provided by the other embodiments of the present invention, and the housings of the crimp terminals are integrated into the housing of the crimp terminal module.

In an embodiment, the first attachment sheet of each crimp terminal in the crimp terminal module is in contact with the metal conductive sheet provided on the compensation plate, respectively.

An embodiment of the present invention provides a terminal box, comprising at least one crimp terminal module provided by the other embodiments of the present invention, wherein each crimp terminal module in the terminal box is electrically connected to the circuit board, respectively.

An embodiment of the present invention provides a tester, comprising a host machine with a display screen and a terminal box as provided in the other embodiments of the present invention, wherein the terminal box transmits electrical parameters of test wires connected to the terminal box to the host machine, and the host machine obtains a display result according to the electrical parameters, and displays the display result on the display screen.

Hereinafter, the crimp terminal, crimp terminal module, terminal box and tester of the present invention will be described in detail with reference to specific embodiments and the accompany drawings.

First Embodiment

Figure 2:
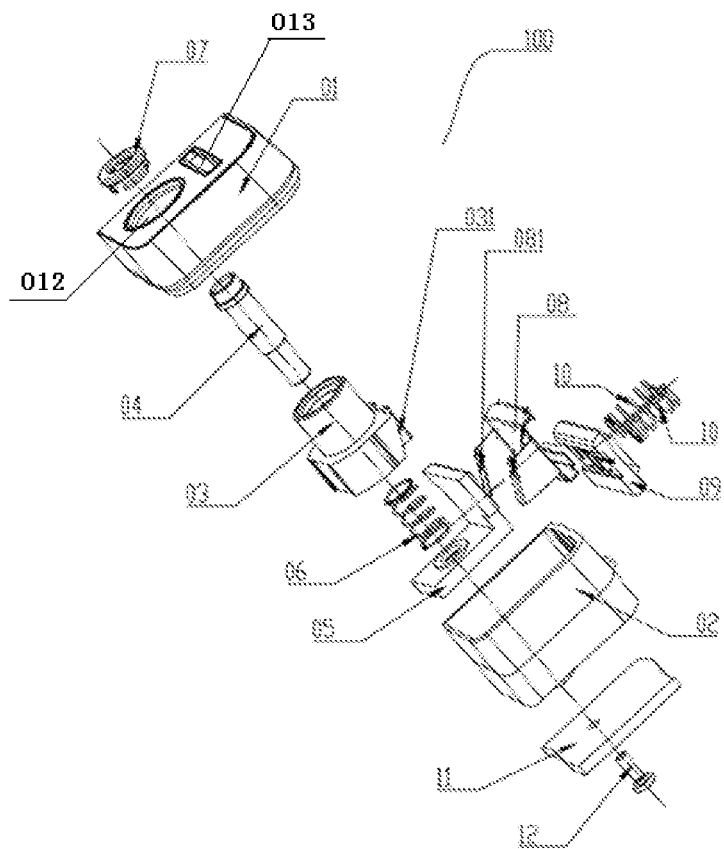
FIG. 2 is a structural exploded view of the crimp terminal according to the first embodiment of the present invention.
Figure 3:
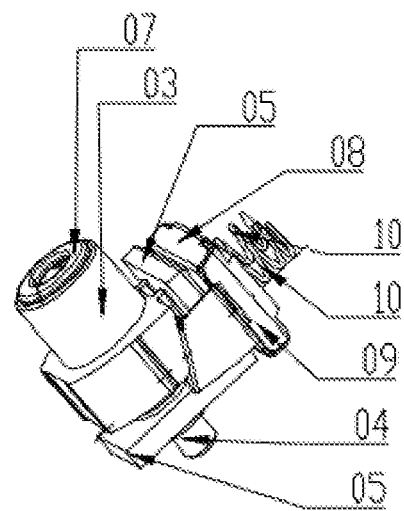
FIG. 3 is a schematic diagram of an installation structure of various components in the crimp terminal according to the first embodiment of the present invention.

The crimp terminal of the present invention is used for connecting temperature sensing elements of various sizes and specifications of the testing end wire. Referring to FIGS. 1 to 3, the crimp terminal 100 includes a housing 00, a press button 03 and a crimping mechanism. In the present embodiment, the crimping mechanism includes a first attachment sheet 05 and a second attachment sheet 08, and an openable and closable wiring port 010 is formed at a position where the first attachment sheet 05 and the second attachment sheet are attached. The housing 00 is formed by coupling a face cover 01 and a lower housing 02 together, and the face cover 01 is provided with a first opening 012 and a second opening 013, where the press button 03 is located in the housing with an upper portion thereof protruded from the first opening 012. The wiring port 010 formed by the first attachment sheet 05 and the second attachment sheet 08 is located in the housing 00 and corresponds to the second opening 013 of the housing 00, with the second attachment sheet 08 being in contact with a lower portion of the press button 03.

The press button 03 is provided with a wiring jack 034 at a top thereof, and an accommodating cavity at a middle thereof for accommodating a wiring end of the sensing element, the wiring jack 034 being communicated with the accommodating cavity. A conductive post 04 is arranged in the accommodating cavity. The wiring end of the sensing element inserted into the accommodating cavity of the press button 03 is electrically connected to the conductive post 04. A bottom of the lower housing 02 of the housing 00 is provided with an opening, and a lower end of the conductive post 04 penetrates through the accommodating cavity and protrudes from the bottom opening of the housing 00, so that the conductive post 04 is electrically connected to a circuit board below the housing 00. In the present embodiment, the conductive post 04 may be a banana socket with a conductive function (used in conjunction with a wiring end having a banana plug).

The crimp terminal 100 is further provided with a first elastic member 06. The first elastic member 06 is located between the press button 03 and the bottom of the lower housing 02 of the housing 00 to provide an elastic force for the restoration of the press button 03. In the present embodiment, the first elastic member 06 is a spring, which is fitted over a portion of the conductive post 04 penetrating out of the accommodating cavity of the press button 04.

The first attachment sheet 05 is made of a metal material, and the first attachment sheet 05 is connected to the conductive post 04. In the present embodiment, the first attachment sheet 05 is a bending piece connected by a vertical wall with a horizontal wall. The wiring port 010 is formed where the vertical wall of the first attachment sheet and the second attachment sheet are attached, and the horizontal wall of the first attachment sheet 05 is provided with a through hole, through which the conductive post 04 penetrates. At this time, the first elastic member 06 (a spring in this embodiment) is defined between the press button 03 and the first attachment sheet 05.

The second attachment sheet 08 has two vertical edges that are bent in the same direction to wrap the first attachment sheet 05. The two bent edges of the second attachment sheet 08 are in slide contact with the lower portion of the press button 03, so that when the press button is moved vertically, the second attachment sheet 08 is moved horizontally to be away from the vertical wall of the first attachment sheet 05, and then the wiring port 010 is opened. In the present embodiment, the two bent edges of the second attachment sheet 08 are respectively provided with an upward first inclined surface 081 or a first arc surface (not shown), the lower portion of the press button 03 is provided with downward press button inclined surfaces 031 at positions corresponding to the first inclined surfaces 081 or the first arc surfaces (not shown), and the first inclined surfaces 081 or the first arc surfaces (not shown) are in slide contact with the press button inclined surfaces 031. Specifically, the first inclined surface (081) can be set as the first arc surface.

The crimp terminal 100 also includes an elastic mechanism, which is located between the second attachment sheet 08 and an inner wall of the housing 00 to provide a restoration elastic force for the second attachment sheet 08. The elastic mechanism includes a limiting block 09 and a second elastic member 10. In the present embodiment, the second elastic member 10 may be a spring, and the limiting block 09 is provided with a plurality of circular holes (in the embodiment shown in FIGS. 2 and 3, the limiting block 09 is provided with two circular holes), which are respectively used to fit the second elastic member (spring in this embodiment) 10. The hole wall acts as a guide for the second elastic member 10, and the hole walls of the two circular holes are provided with small protrusions for limiting the second elastic member 10 to prevent its dislocation. The limiting block 09 is fixedly installed on the back of the second attachment sheet 08, the second elastic member 10 is located between the second attachment sheet 08 and the housing wall of the housing 00, and there is a distance between the limiting block 09 and the housing wall of the housing 00. Preferably, in the present embodiment, an arc-shaped protrusion 051 is provided on a side of the vertical wall of the first attachment sheet 05 where it is attached to the second attachment sheet 08. The arc-shaped protrusion 051 is located within the wiring port 010, and facilitates direct insertion of the wiring end of the sensing element at the time when the wiring port 010 is not opened.

The first attachment sheet 05 and the conductive post 04 of the crimp terminal 100 are both made of tellurium copper alloy with metal plating. Tellurium copper alloy has excellent electrical and thermal conductivity properties, plays a role of anti-corrosion and wear resistance after gold plating, and can further reduce the contact potential. The first attachment sheet 05 can be a block metal, which has an effect of heat capacity pool, and has a rapid heat equalization effect on the frictional heat generated when the wiring end is connected.

Referring to FIGS. 1 to 3, the crimp terminal 100 further includes a color code 07 that is installed at an upper opening of the press button 03. The color code 07 is marked with different colors. For example, the red color code indicates the positive electrode, the black color code indicates the negative electrode, and the green color code indicates the ground wire.

Figure 4:
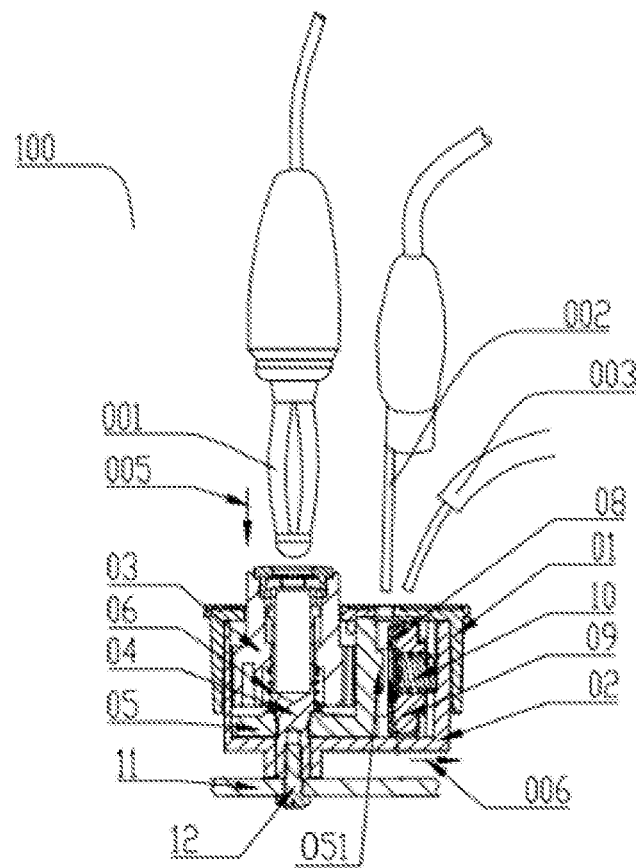
FIG. 4 is a schematic diagram showing a state of the crimp terminal according to the first embodiment of the present invention after the press button is pressed.
Figure 5:
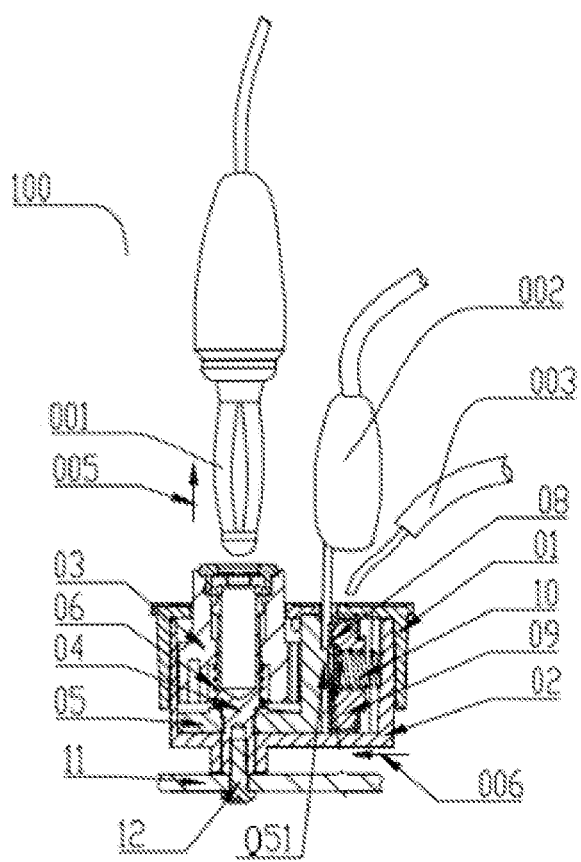
FIG. 5 is a schematic diagram showing a state of the crimp terminal according to the first embodiment of the present invention after the press button is released and the spade plug is inserted.

At the operation of the above-described crimp terminal 100, if a wiring end of the sensing element with a banana plug 001 is to be plug-connected, the banana plug 001 can be directly inserted through the color code 07, into the accommodating cavity of the press button 03 and in close contact with the conductive post (referring to a banana socket in this embodiment) 04. If a wiring end of the sensing element with a bare wire 002 or a spade plug 003 is to be plug-connected, as shown in FIG. 4, the press button 03 is pressed and the first elastic member 06 is compressed, causing the press button inclined surface 031 to move downward and then press the first inclined surface 081 or the first arc surface (not shown) in contact therewith. This causes the second elastic member 10 to be compressed and the second attachment sheet 08 to move horizontally to the right (the right side in FIG. 4) under the action of the press button inclined surface 031, so that the wiring port 010 between the vertical wall of the first attachment sheet 05 and the second attachment sheet 08 is opened (enlarged). At this time, the bare wire 002 or the spade plug 003 is inserted into the wiring port 010 through the second opening of the housing 00. As shown in FIG. 5, the press button 03 is released, then the second attachment sheet 08 moves to the left (the left side in FIG. 5) under the action of the second elastic member 10, while the press button 03 moves upward under the action of the first elastic member 06, so that the bare wire 002 or the spade plug 003 is firmly clamped in the wiring port 010 formed by the vertical wall of the first attachment sheet 05 and the second attachment sheet 08 (At this time, the bare wire 002 or the spade plug 003 is subjected to dual elastic forces). Compared with the conventional screwing method, the crimping method of the crimp terminal 100 can reduce friction and decrease the heat generated by the friction, thereby achieving an effect of reducing the contact potential between the wiring end of the sensing element and the crimp terminal.

Second Embodiment

Figure 6:
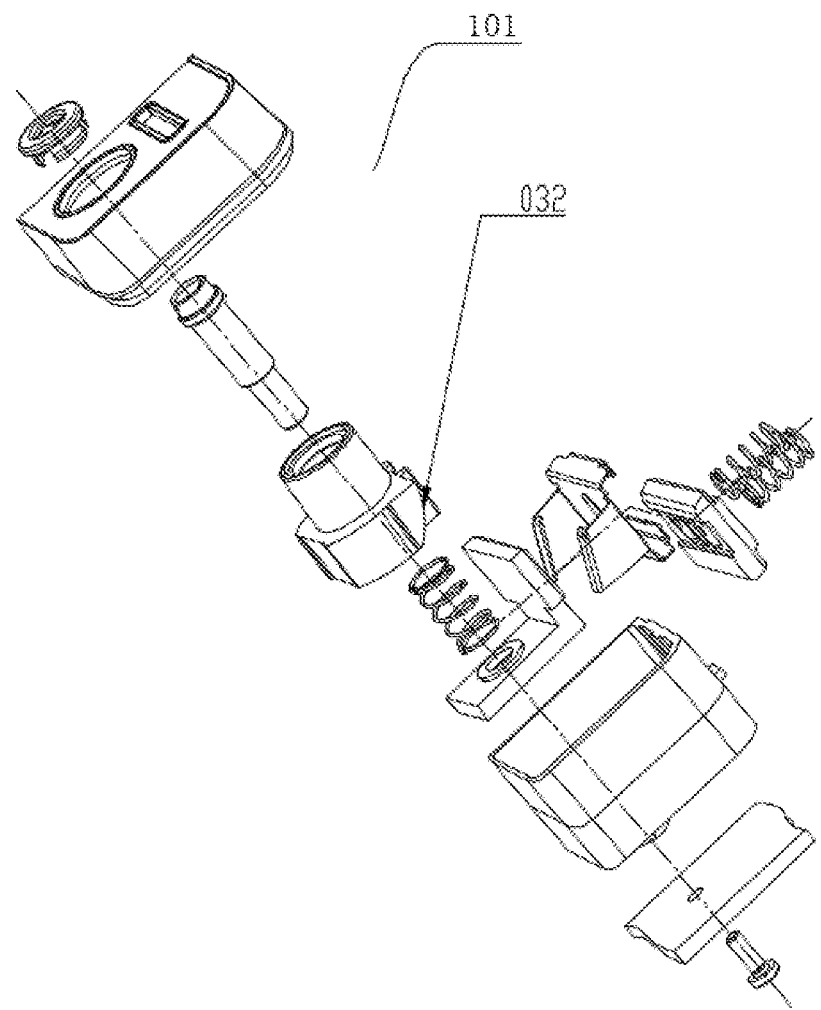
FIG. 6 is a structural exploded view of a crimp terminal according to a second embodiment of the present invention.

As shown in FIG. 6, a crimp terminal 101 of a second embodiment is a modification on the basis of the crimp terminal 100 of the first embodiment, and the parts with the same structure as that of the crimp terminal 100 of the first embodiment will not be reiterated herein. The structure of the crimp terminal 101 of the present embodiment is different from that of the crimp terminal 100 of the first embodiment in that the two press button inclined surfaces 031 of the press button 03 are replaced by two press button arc surfaces 032. The press button arc surface 032 is arranged vertically, and has a relatively small contact area (line contact) with the second inclined surface 081. At this time, in order to prevent deformation of the second attachment sheet 08, the second attachment sheet 08 can be thickened. Of course, the press button inclined surface 031 of the press button 03 can also be replaced by an end surface of other shapes, as long as contact of the end surface of the press button 03 with the first inclined surface 081 can be realized, and the vertical movement of the press button 03 can be converted into the horizontal movement of the second attachment sheet 08.

Third Embodiment

Figure 7:
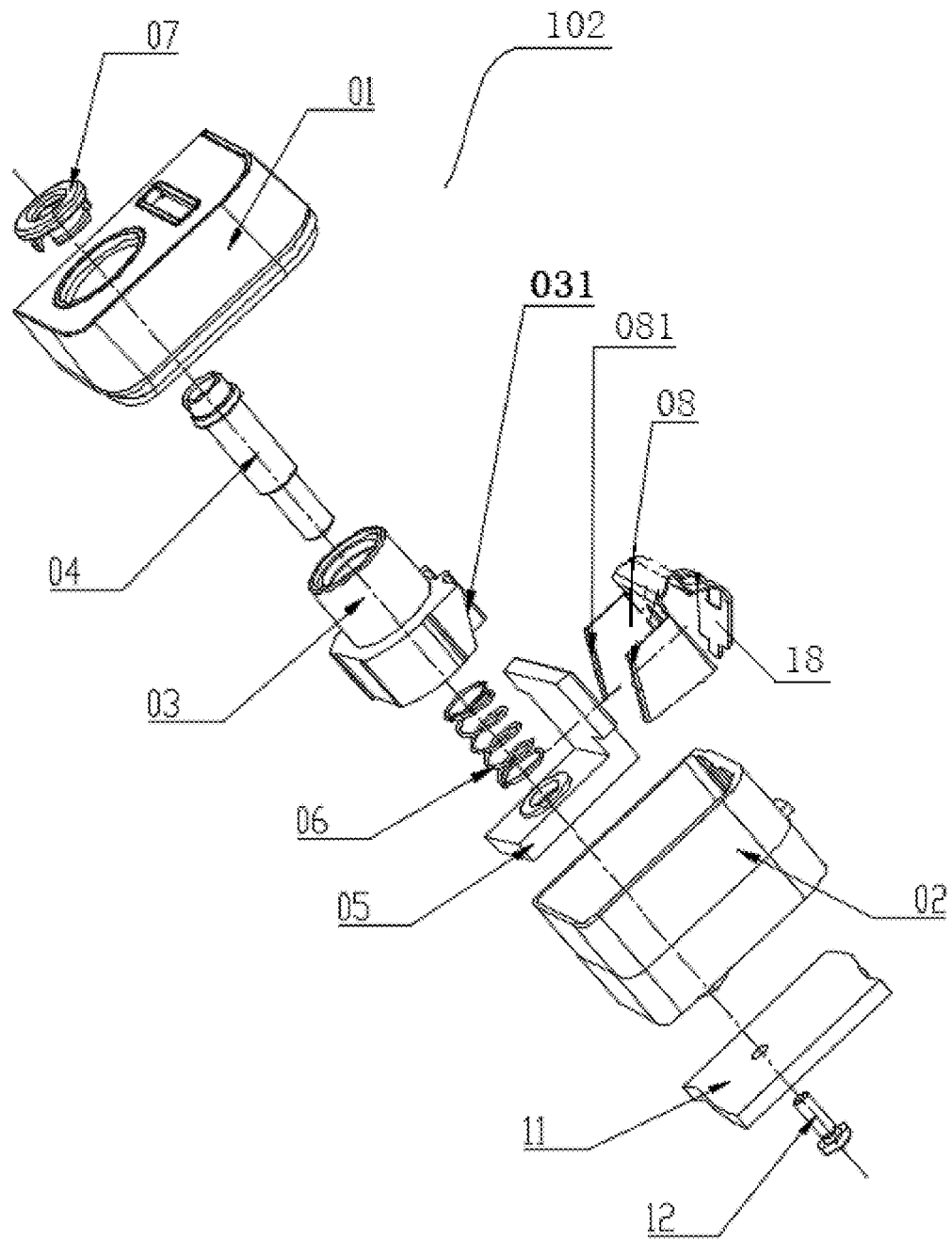
FIG. 7 is a structural exploded view of a crimp terminal according to a third embodiment of the present invention.
Figure 8:
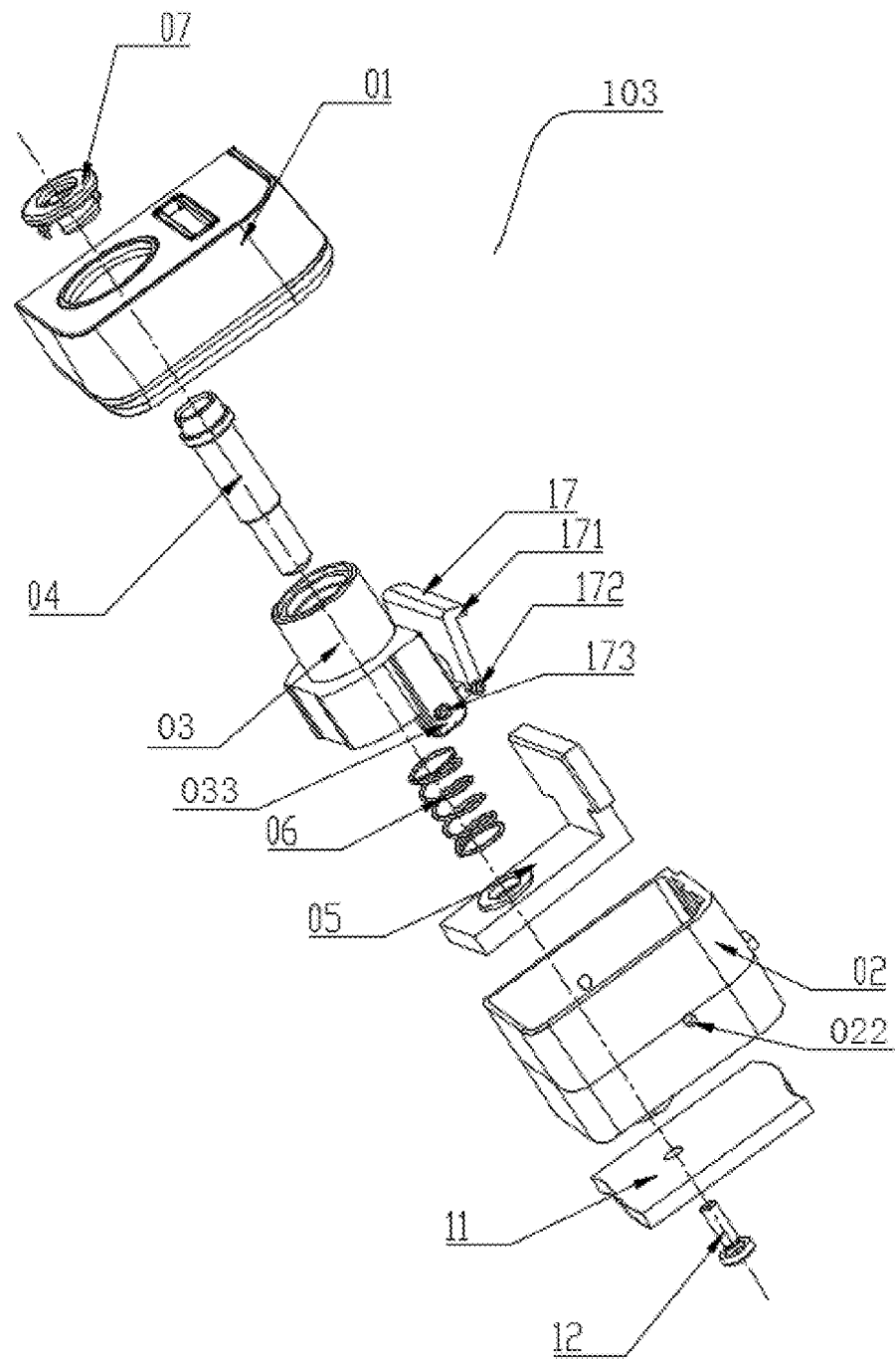
FIG. 8 is a structural exploded view of a crimp terminal according to a fourth embodiment of the present invention.

As shown in FIG. 7, a crimp terminal 102 of a third embodiment is an improvement on the basis of the crimp terminal 100 of the first or second embodiment, and the parts with the same structure as that of the crimp terminal 100 of the first or second embodiment will not be reiterated herein. The crimp terminal 102 of the present embodiment is different in structure from the crimp terminal 100 of the first embodiment or the crimp terminal 101 of the second embodiment in that the elastic mechanism is a C-shaped elastic sheet 18. The C-shaped elastic sheet 18 is located between the second attachment sheet 08 and the inner wall of the housing 00 (on the right side of the second attachment sheet 08 in FIG. 7), at least one end of a C-shaped opening of the C-shaped elastic sheet 18 is supported on the second attachment sheet 08, and a C-shaped closed end surface is in contact with the inner wall of the housing 00.

At the operation of the above-described crimp terminal 102, if a wiring end of the sensing element with a bare wire 002 or a spade plug 003 is to be plug-connected, the press button 03 is pressed and the first elastic member 06 is compressed, causing the press button inclined surface 031 or the press button arc surface 032 to move downward and then press the first inclined surface 081 or the first arc surface 082 in contact therewith. This causes the C-shaped elastic sheet 18 to be stretched and the arc thereof reduced, and the second attachment sheet 08 to move horizontally under the action of the press button inclined surface 031, so that the wiring port 010 between the vertical wall of the first attachment sheet 05 and the second attachment sheet 08 is opened. At this time, the bare wire 002 or the spade plug 003 is inserted into the wiring port 010 through the second opening on the housing 00. Then the press button 03 is released, the arc of the C-shaped elastic sheet 18 is enlarged (returned to the original arc), and the second attachment sheet 08 is moved horizontally and reversely under the elastic force of the C-shaped elastic sheet 18, while the press button 03 is moved upward under the action of the first elastic member 06, so that the bare wire 002 or the spade plug 003 is firmly clamped in the wiring port 010 between the vertical wall of the first attachment sheet 05 and the second attachment sheet 08 (At this time, the bare wire 002 or the spade plug 003 is subjected to dual elastic forces). Compared with the conventional screwing method, the crimping method of the crimp terminal 102 can also reduce friction and decrease the heat generated by the friction, thereby achieving an effect of reducing the contact potential between the plug and the terminal.

Fourth Embodiment

Figure 9:
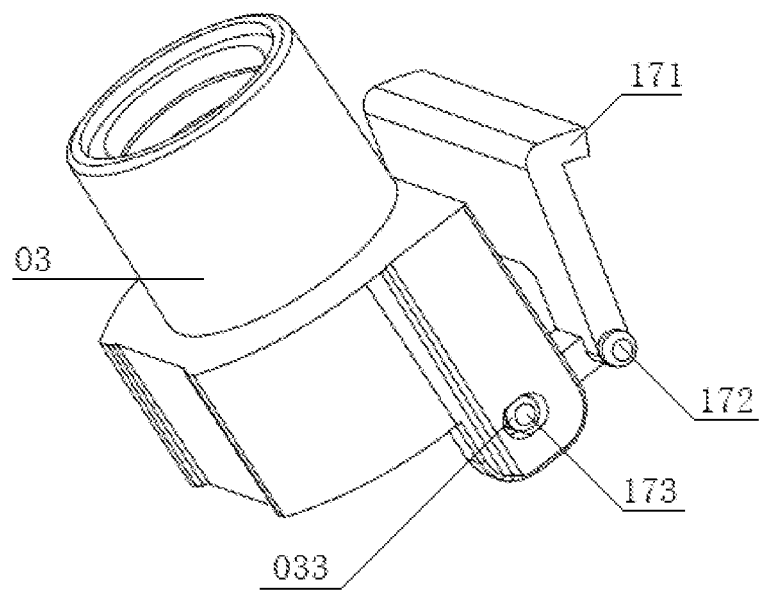
FIG. 9 is a schematic diagram of an installation structure of the crimp block and the press button.

Referring to FIGS. 8 to 11, which are structural diagrams of a crimp terminal 103 of a fourth embodiment. The crimp terminal 103 of the present embodiment is different in structure from each of the above-described crimp terminals in that the structure of the second attachment sheet 08 is different. As shown in FIG. 9, the second attachment sheet is replaced with an S-shaped crimp block 17, which is arranged between the press button 03 and the vertical wall of the first attachment sheet 05. The lower portion of the press button 03 is rotatably connected with an S-shaped lower bending end of the crimp block 17, and the crimp block 17 is rotatable along a rotating shaft 172 provided at the lower bending end. The crimp block 17 is provided with a vertical crimp plate, and the rotating shaft 172 is provided at a bottom of the crimp plate. An upper bending end 171 of the crimp block 17 serves as a pressing edge to contact the vertical wall of the first attachment sheet 05 where a wiring port 010 is formed. The crimp block 17 is provided with a crimp post 173 at an end of the lower bending end. The crimp post 173 is inserted into a press button limiting hole 033 provided at the lower portion of the press button 03, and is movable in the press button limiting hole 033. In the present embodiment, the rotating shaft 172 is installed in a mounting hole 022 provided on the side wall of the housing 00, and the crimp block 17 is rotatable along the rotating shaft 172 thereof.

Figure 10:
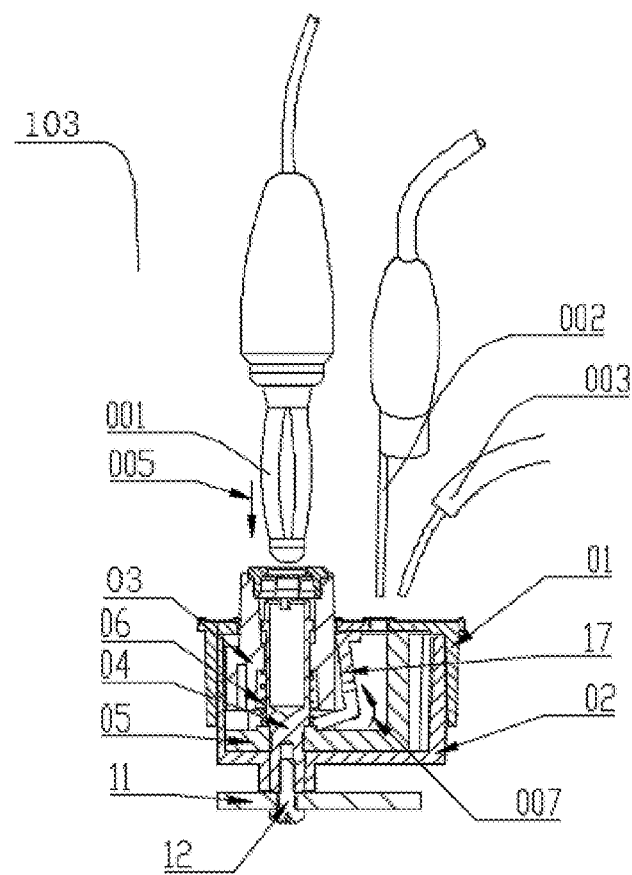
FIG. 10 is a schematic diagram showing a state of the crimp terminal according to the fourth embodiment of the present invention after the press button is pressed.
Figure 11:
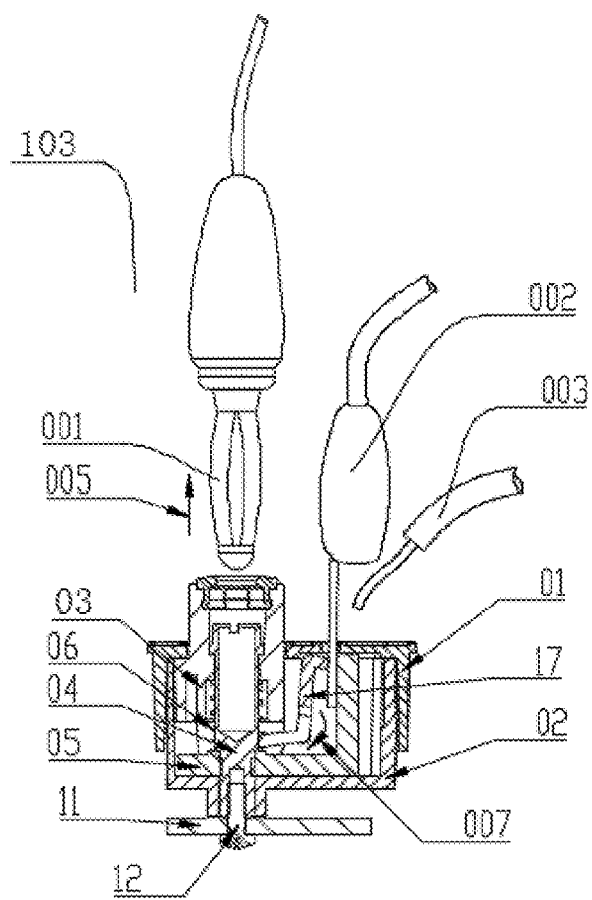
FIG. 11 is a schematic diagram showing a state of the crimp terminal according to the fourth embodiment of the present invention after the press button is released and the spade plug is inserted.
Figure 12:
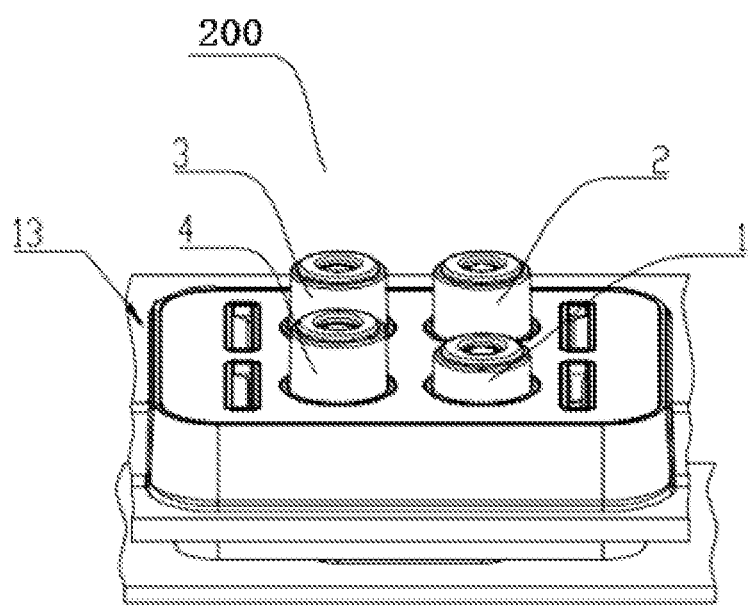
FIG. 12 is a perspective structural view of a crimp terminal module according to an embodiment of the present invention.

At the operation of the above-described crimp terminal 103, if a wiring end of the sensing element with a bare wire 002 or a spade plug 003 is to be plug-connected, as shown in FIG. 10, the press button 03 is pressed and the first elastic member 06 is compressed, causing the press button 03 to move downward, thereby driving the crimp post 173 of the crimp block 17 to move downward (the press button limiting hole 033 is an elliptical hole with a space for movement, and the crimp post 173 is movable in the press button limiting hole 033 to meet the purpose of the crimp block 17 being rotatable along the rotating shaft 172), so that the crimp block 17 is rotated along the rotating shaft 172, and the wiring port 010 between the upper bending end (pressing edge) 171 and the vertical wall of the first attachment sheet 05 is opened. At this time, the bare wire 002 or the spade plug 003 is inserted into the wiring port 010 through the second opening 013 of the housing 00. Then the press button 03 is released, and the press button 03 is moved upward under the action of the first elastic member 06, driving the crimp post 173 to move upward (while the crimp post 173 moves in the press button limiting hole 033), and the crimp block 17 to rotate around the rotating shaft 172, so that the bare wire 002 or the spade plug 003 is firmly clamped in the wiring port 010 between the vertical wall of the first attachment sheet 05 and the upper bending end 171 of the crimp block 17. Compared with the conventional screwing method, the crimping method of the crimp terminal 103 can also reduce friction and decrease the heat generated by the friction, thereby achieving an effect of reducing the contact potential between the plug and the terminal FIGS. 12 to 17 show a structure of a crimp terminal module 200. The crimp terminal module 200 includes at least two crimp terminals. The crimp terminal in the crimp terminal module 200 may be one or a combination of two of the crimp terminals 100, 101, 102, 103 mentioned above. The housings of the wiring terminals are integrated to form a housing of the crimp terminal module.

Figure 13:
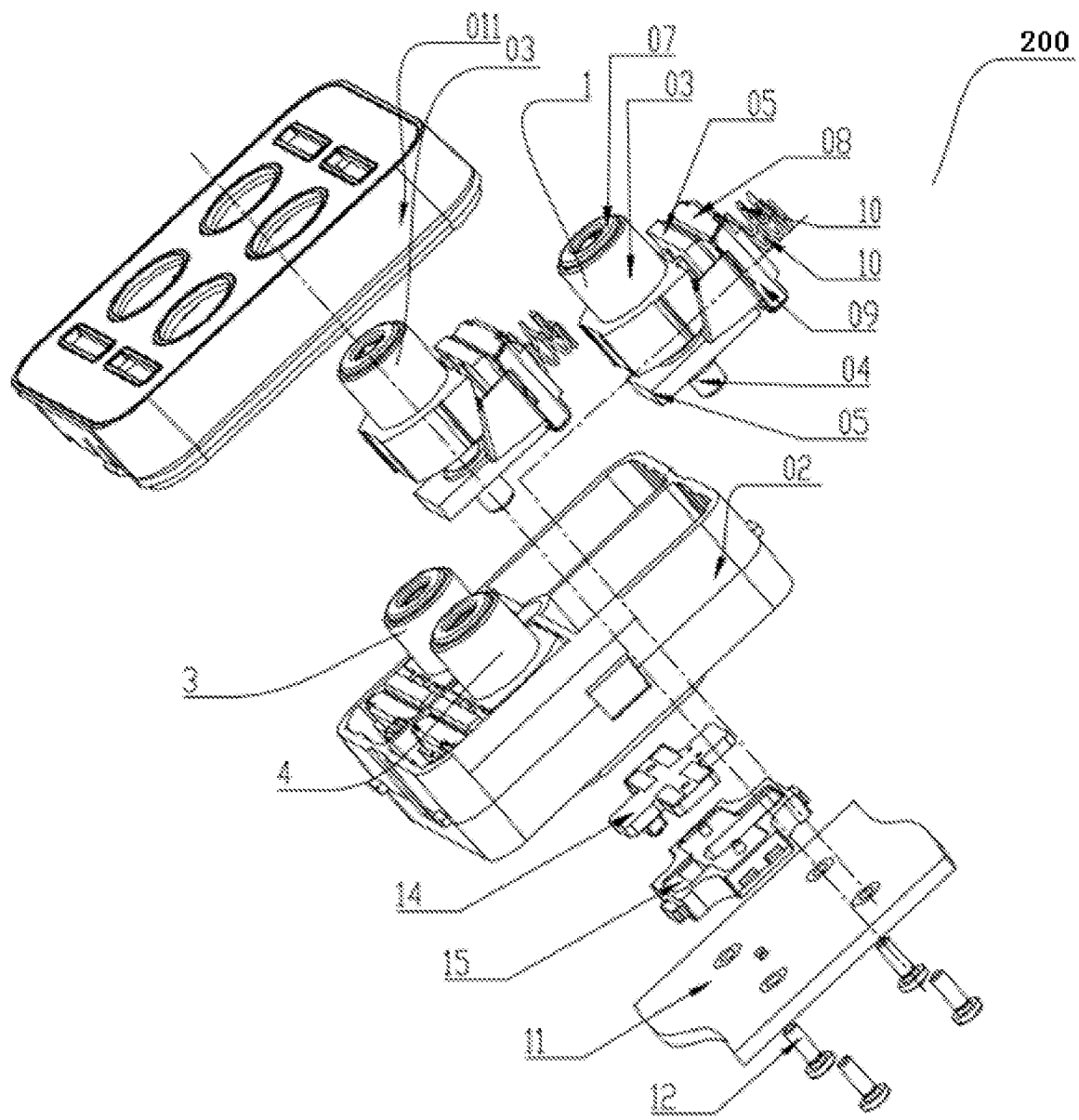
FIG. 13 is a first structural exploded view of the crimp terminal module according to the embodiment of the present invention.
Figure 14:
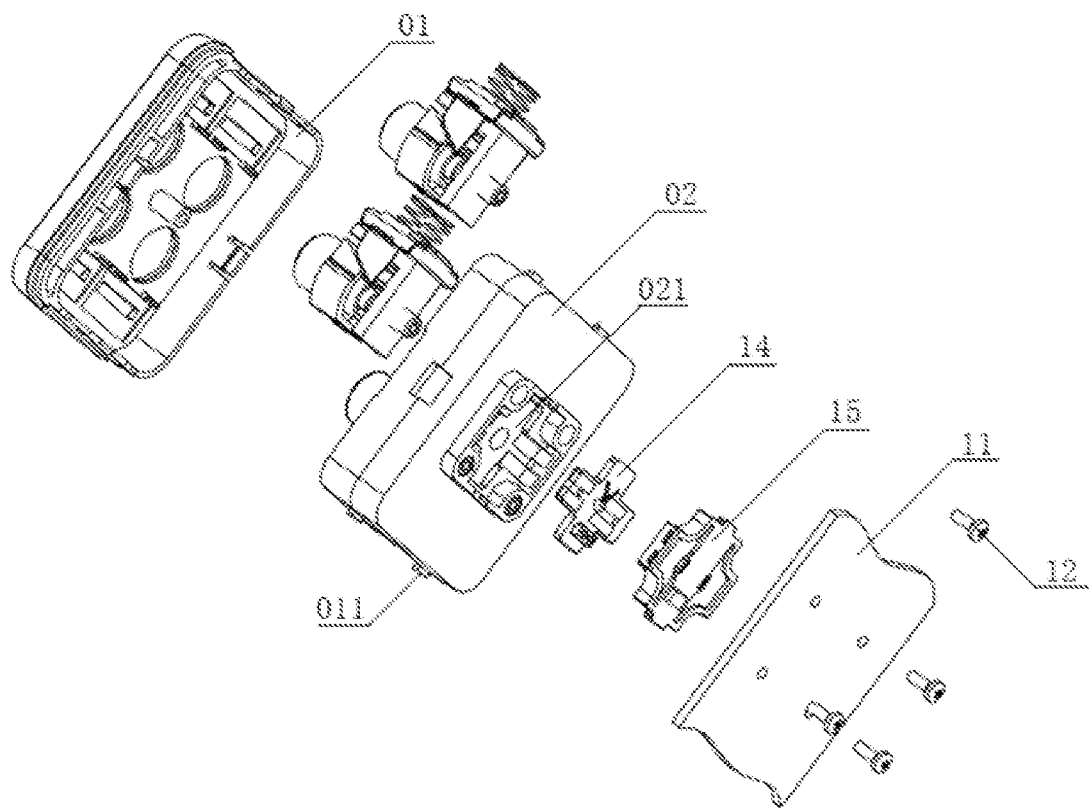
FIG. 14 is a second structural exploded view of the crimp terminal module according to the embodiment of the present invention.

In the embodiment shown in FIG. 13, each crimp terminal further includes a temperature sensor, which senses the temperature of the first attachment sheet 05, and in turn senses the temperature of the sensing element inserted into the wiring jack 034 or the wiring port 010 to compensate for the detected temperature difference potential. To facilitate the installation and wiring of the temperature sensor, each crimp terminal further includes a compensation plate 14 and a compensation plate support 15. The compensation plate 14 is provided with a metal conductive sheet, and the compensation plate 14 is an insulator with good thermal conductivity. The metal conductive sheet is in contact with the first attachment sheet 05, and the temperature sensor senses the temperature of the first attachment sheet 05 by sensing the temperature of the metal conductive sheet. In one embodiment, the sensor is close to the metal conductive sheet but not connected to the metal conductive sheet, and the sensor detects the air temperature near the metal sheet, thereby sensing the temperature of the first attachment sheet 05. A third opening 021 is provided on the bottom of the housing 00 at a position corresponding to the first attachment sheet 05. The compensation plate 14 is installed outside of the bottom of the housing 00, and the metal conductive sheet arranged thereon is in contact with the first attachment sheet 05 through the third opening 021. The compensation plate support 15 is fastened to the compensation plate 14. A wiring end electrically connected to the temperature sensor can be extended from a through hole provided in the compensation plate support 15 for connection to a circuit board 11. The metal conductive sheet and the temperature sensor are respectively arranged on an upper surface and a lower surface of the compensation plate 14.

Figure 17:
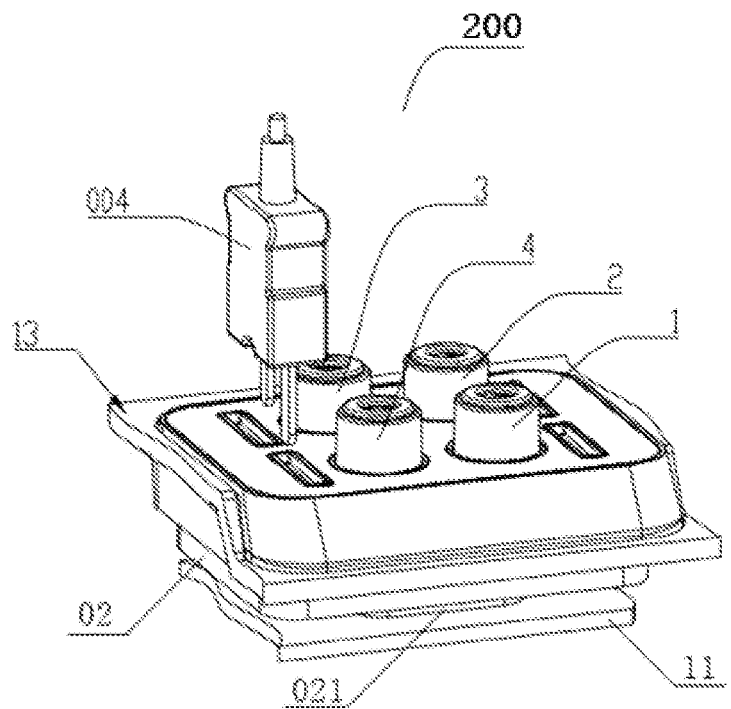
FIG. 17 is a schematic diagram showing a Min-TC terminal being plug-connected into the crimp terminal module.

Referring to FIGS. 12 to 17, the crimp terminal module 200 in the present embodiment is composed of four crimp terminals. Terminal 1, terminal 2, terminal 3 and terminal 4 are respectively formed as the upper portions of the press buttons 03 of the four crimp terminals that are protruded out of the first openings provided on the housing. The second openings are provided on the housing and separately on opposite sides, and are respectively aligned with the wiring port 010 of each crimp terminal. The two second openings on each side can be used for plug-connecting wiring ends of a sensing element with a Min-TC plug (see FIG. 17). In the present embodiment, the first attachment sheet 05 of each crimp terminal is in contact with the metal conductive sheet provided on the compensation plate 14, respectively. In one embodiment, the metal sheets are close to each other, while the metal sheet and the sensor are relatively close but not connected to each other, respectively. The sensor measures the air temperature near the metal sheet so as to sense the temperature of the metal sheet, As shown in FIG. 17, the housing of the crimp terminal module 200 is provided with two clasps 011, and a panel 13 can be directly clasped onto the housing through the clasps 13. The advantage of such an arrangement is that the panel 13 can be easily installed and disassembled without falling off.

Figure 15:
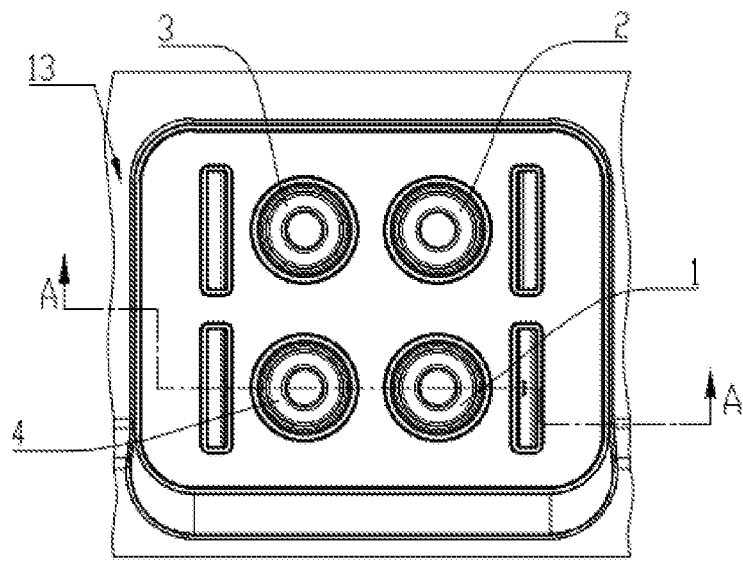
FIG. 15 is a front view of the crimp terminal module according to the embodiment of the present invention.
Figure 16:
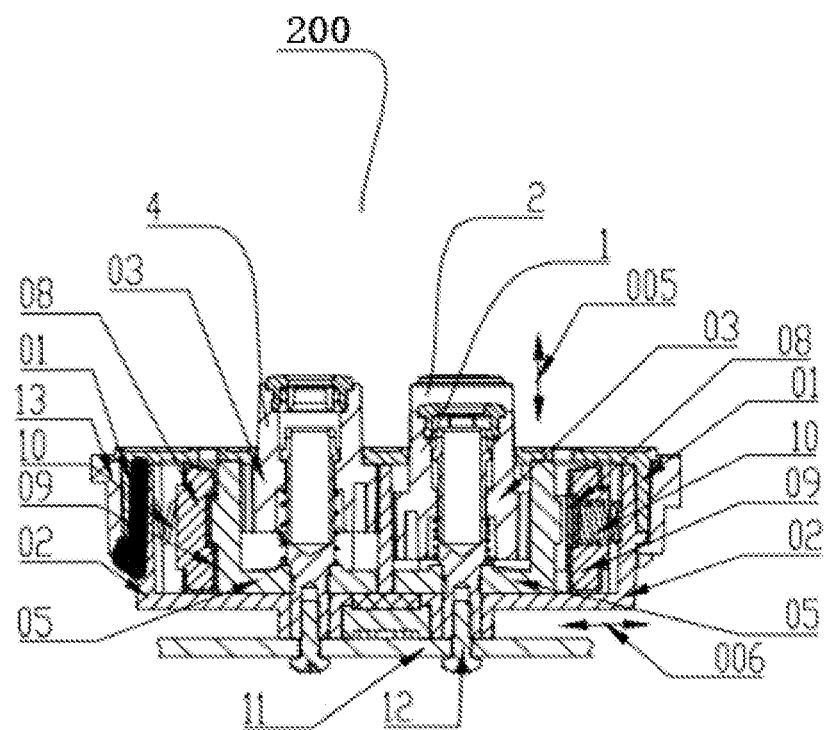
FIG. 16 is a cross-sectional view taken along a line A-A in FIG. 15.

The crimp terminal module 200 can be used to connect a group of four-wire or three-wire thermocouples, and can also be used to connect two groups of two-wire thermocouples or thermal resistors. For example, as shown in FIGS. 15 and 17, the multi-functional first terminal 1, second terminal 2, third terminal 3 and fourth terminal 4 can be combined in pairs to connect the two-wire thermocouples or thermal resistors. The specific two combinations that can achieve the predetermined detection function are determined according to circuit settings of the circuit board 11 and connections between the respective terminals and the circuit board 11. The specific circuit settings of the circuit board 11 can be realized by using an existing detection circuit board, which is not the content of interest to the present application and will not be discussed herein.

The above embodiment is only an example of a crimp terminal module formed by a combination of the crimp terminals 100. Similarly, a combination of any one or more crimp terminals of the crimp terminals 100, 101, 102, 103 can also be adopted to form a crimp terminal module with the same function and of basically the same structure, the discussion of which will be omitted herein.

The crimp terminal of the present invention can be freely combined into crimp terminal modules of various specifications. The crimp terminal module can be applied in a terminal box, where the terminal box includes at least one crimp terminal module 200. The terminal box can also be used in different types of testers, one type of which includes a host machine with a display screen and the terminal box having at least two crimp terminal modules. The terminal box transmits electrical parameters of test wires connected to the terminal box to the host machine, and the host machine obtains a display result according to the electrical parameters, and displays the obtained display result on the display screen.

Those of ordinary skills in the art will appreciate that these embodiments or implementations are merely for illustration of the present invention and do not limit the scope of the present invention. Various equivalents, variations and modifications to the present invention all belong to the disclosure of the present invention.

The invention claimed is:

1. A crimp terminal for connecting to wiring ends of sensing elements, the crimp terminal comprising:
    a housing;
    a press button having an upper portion protruded from a first opening that is provided in the housing, and a lower portion located in the housing; and
    a crimping mechanism located in the housing and in contact with the lower portion of the press button, the crimping mechanism being provided with an openable and closable wiring port, and the housing being provided with a second opening corresponding to the wiring port, wherein
    when the press button is pressed vertically, the wiring port is opened, allowing a wiring end of a sensing element to be inserted into the wiring port from the second opening, and
    a top end of the press button is provided with a wiring jack, and an inner portion of the press button is provided with an accommodating cavity for accommodating a wiring end of another sensing element, the accommodating cavity being communicated with the wiring jack.

2. The crimp terminal according to claim 1, wherein a conductive post is arranged in the accommodating cavity, so that the wiring end of the another sensing element inserted into the accommodating cavity through the wiring jack is electrically connected to the conductive post.

3. The crimp terminal according to claim 2, wherein the conductive post is protruded outward from a bottom of the housing so as to be electrically connected to a circuit board disposed below the housing; the crimp terminal further comprises a first elastic member arranged below the press button to provide an elastic force for restoration of the press button; and the conductive post is a banana socket, and the first elastic member is a spring, which is fitted over a portion of the banana socket extended out of the accommodating cavity of the press button.

4. The crimp terminal according to claim 2, wherein the crimping mechanism comprises a first attachment sheet and a second attachment sheet that are separable from and attachable to each other, and the wiring port is formed where the second attachment sheet and the first attachment sheet are attached to each other, and wherein the first attachment sheet is made of a metal and is in contact with the conductive post, so that the wiring end of the sensing element inserted into the wiring port is electrically connected to the conductive post.

5. The crimp terminal according to claim 4, wherein the first attachment sheet is a bending piece connected by a vertical wall and a horizontal wall, the vertical wall of the first attachment sheet is attached to the second attachment sheet, and the horizontal wall of the first attachment sheet is provided with a through hole, through which the conductive post penetrates.

6. The crimp terminal according to claim 4, wherein the second attachment sheet has two vertical edges that are bent in the same direction to wrap the first attachment sheet, and the two bent edges of the second attachment sheet are in slide contact with the lower portion of the press button, so that when the press button is moved vertically, the second attachment sheet is moved horizontally to be separated from the first attachment sheet.

7. The crimp terminal according to claim 6, wherein the lower portion of the press button is provided with downward press button inclined surfaces, the two bent edges of the second attachment sheet are provided with upward first inclined surfaces, and the first inclined surfaces are in slide contact with the press button inclined surfaces, respectively; or
    the lower portion of the press button is provided with downward press button arc surfaces, the two bent edges of the second attachment sheet are provided with upward first inclined surfaces, and the first inclined surfaces are in slide contact with the press button arc surfaces, respectively; or
    the lower portion of the press button is provided with downward press button inclined surfaces, the two bent edges of the second attachment sheet are provided with upward first arc surfaces, and the press button inclined surfaces are in slide contact with the first arc surfaces, respectively.

8. The crimp terminal according to claim 4, wherein an arc-shaped protrusion is provided on a side of the first attachment sheet being attached to the second attachment sheet, and is located within the wiring port.

9. The crimp terminal according to claim 4, further comprising an elastic mechanism arranged between the second attachment sheet and an inner wall of the housing, wherein the elastic mechanism provides an elastic force for restoration of the second attachment sheet, so that the second attachment sheet is attached to the first attachment sheet.

10. The crimp terminal according to claim 9, wherein the elastic mechanism comprises a limiting block and a second elastic member, the limiting block is attached to the second attachment sheet and limits the second elastic member, and the second attachment sheet is attached to the first attachment sheet under an elastic force of the second elastic member.

11. The crimp terminal according to claim 10, wherein the second elastic member is a spring, the limiting block is fixed on a back of the second attachment sheet, the limiting block is provided with a plurality of circular holes into each of which a spring is fitted, and there is a distance between the limiting block and the inner wall of the housing.

12. The crimp terminal according to claim 9, wherein the elastic mechanism is a C-shaped elastic sheet located between the second attachment sheet and the inner wall of the housing, having at least one end of a C-shaped opening thereof supported on the second attachment sheet and a C-shaped closed end surface thereof in contact with the inner wall of the housing.

13. The crimp terminal according to claim 4, wherein the second attachment sheet is replaced with an S-shaped crimp block arranged between the press button and the vertical wall of the first attachment sheet, and the lower portion of the press button is rotatably connected to an S-shaped lower bending end of the crimp block,
wherein when the press button is vertically pressed or released, the crimp block is driven to rotate along a rotating shaft provided at the lower bending end, and an upper bending end of the crimp block acting as a pressing edge is driven to be separated from or close to the first attachment sheet, so that the wiring port formed where the upper bending end contacts the vertical wall of the first attachment sheet is opened or closed.

14. The crimp terminal according to claim 13, wherein the crimp block is provided with a vertical crimp plate, and the rotating shaft is provided at a bottom of the crimp plate, wherein an end of the lower bending end is provided with a crimp post, which is inserted into a press button limiting hole provided at the lower portion of the press button, and is movable in the press button limiting hole.

15. The crimp terminal according to claim 4, further comprising a temperature sensor configured to sense a temperature of the first attachment sheet, so as to obtain a temperature of the wiring end of the sensing element inserted from the wiring port and the wiring jack.

16. The crimp terminal according to claim 15, further comprising a compensation plate on which a metal conductive sheet is arranged, wherein the metal conductive sheet is in contact with the first attachment sheet, and the temperature sensor senses the temperature of the first attachment sheet by sensing a temperature of the metal conductive sheet.

17. The crimp terminal according to claim 16, wherein a third opening is provided on the bottom of the housing at a position corresponding to the first attachment sheet, the compensation plate is installed outside of the bottom of the housing, and the metal conductive sheet on the compensation plate is in contact with the first attachment sheet through the third opening.

18. The crimp terminal according to claim 16, wherein a wiring end electrically connected to the temperature sensor is provided on the compensation plate and for electrical connection to the circuit board; and the metal conductive sheet and the temperature sensor are respectively arranged on an upper surface and a lower surface of the compensation plate, and the metal conductive sheet is in contact with the first attachment sheet.

19. The crimp terminal according to claim 4, wherein the first attachment sheet and the conductive post are both made of tellurium copper alloy with metal plating.

20. A crimp terminal module, comprising a housing and a plurality of crimp terminals independent from each other, wherein housings of the crimp terminals are integrated into the housing of the crimp terminal module; and
each crimp terminal comprises:
a housing;
a press button having an upper portion protruded from a first opening that is provided in the housing, and a lower portion located in the housing; and
a crimping mechanism located in the housing and in contact with the lower portion of the press button, the crimping mechanism being provided with an openable and closable wiring port, and the housing being provided with a second opening corresponding to the wiring port, wherein
when the press button is pressed vertically, the wiring port is opened, allowing a wiring end of a sensing element to be inserted into the wiring port from the second opening, and
a top end of the press button is provided with a wiring jack, and an inner portion of the press button is provided with an accommodating cavity for accommodating a wiring end of another sensing element, the accommodating cavity being communicated with the wiring jack.

21. A tester, comprising a host machine with a display screen and a terminal box, wherein the terminal box comprises at least one crimp terminal module according to claim 20, and each crimp terminal module in the terminal box is electrically connected to the circuit board, respectively; and the terminal box transmits electrical parameters of test wires connected to the terminal box to the host machine, and the host machine obtains a display result according to the electrical parameters, and displays the display result on the display screen.

22. The crimp terminal module according to claim 20, wherein a conductive post is arranged in the accommodating cavity, so that the wiring end of the another sensing element inserted into the accommodating cavity through the wiring jack is electrically connected to the conductive post; and
the conductive post is protruded outward from a bottom of the housing so as to be electrically connected to a circuit board disposed below the housing.

23. The crimp terminal module according to claim 20, wherein the crimping mechanism comprises a first attachment sheet and a second attachment sheet that are separable from and attachable to each other, and the wiring port is formed where the second attachment sheet and the first attachment sheet are attached to each other, and wherein the first attachment sheet is made of a metal and is in contact with the conductive post, so that the wiring end of the sensing element inserted into the wiring port is electrically connected to the conductive post;
wherein the first attachment sheet is a bending piece connected by a vertical wall and a horizontal wall, the vertical wall of the first attachment sheet is attached to the second attachment sheet, and the horizontal wall of the first attachment sheet is provided with a through hole, through which the conductive post penetrates; and
wherein the second attachment sheet has two vertical edges that are bent in the same direction to wrap the first attachment sheet, and the two bent edges of the second attachment sheet are in slide contact with the lower portion of the press button, so that when the press button is moved vertically, the second attachment sheet is moved horizontally to be separated from the first attachment sheet.

24. The crimp terminal module according to claim 23, wherein the first attachment sheet of each crimp terminal in the crimp terminal module is in contact with the metal conductive sheet provided on the compensation plate, respectively.

* * * * *

UNITED STATES PATENT AND TRADEMARK OFFICE
CERTIFICATE OF CORRECTION

PATENT NO. : 12,136,790 B2
APPLICATION NO. : 17/285220
DATED : November 5, 2024
INVENTOR(S) : Qiqi Luo and Xilei Tian It is certified that error appears in the above-identified patent and that said Letters Patent is hereby corrected as shown below:

On the Title Page

(73) Assignee: delete "Beijing ConST Instruments Technology Inc. (CN)" and insert -- Beijing Const Instruments Technology Inc. (CN) --

Signed and Sealed this
Third Day of December, 2024

Katherine Kelly Vidal
*Director of the United States Patent and Trademark Office*